(12) United States Patent
Cortesi et al.

(10) Patent No.: US 9,632,189 B2
(45) Date of Patent: Apr. 25, 2017

(54) ENERGY-SENSITIVE FAST NEUTRON IMAGING DETECTOR AND METHOD FOR ENERGY-SENSITIVE FAST NEUTRON DETECTION

(71) Applicants: PAUL SCHERRER INSTITUT, Villigen Psi (CH); PHYSIKALISCH-TECHNISCHE BUNDESANSTALT, Braunschweig (DE)

(72) Inventors: Marco Cortesi, Verdellino (IT); Volker Dagendorf, Braunschweig (DE); Horst-Michael Prasser, Nussbaumen (CH); Robert Zboray, Rieden (CH)

(73) Assignee: Paul Scherrer Institut, Villigen (CH)

( * ) Notice: Subject to any disclaimer, the term of this patent is extended or adjusted under 35 U.S.C. 154(b) by 0 days.

(21) Appl. No.: 14/427,691

(22) PCT Filed: Aug. 13, 2013

(86) PCT No.: PCT/EP2013/066857
§ 371 (c)(1),
(2) Date: Mar. 12, 2015

(87) PCT Pub. No.: WO2014/040812
PCT Pub. Date: Mar. 20, 2014

(65) Prior Publication Data
US 2015/0247937 A1 Sep. 3, 2015

(30) Foreign Application Priority Data
Sep. 12, 2012 (EP) .................... 12184060

(51) Int. Cl.
*H01J 47/00* (2006.01)
*G01T 3/00* (2006.01)
*G01T 1/185* (2006.01)

(52) U.S. Cl.
CPC .............. *G01T 3/003* (2013.01); *G01T 1/185* (2013.01); *G01T 3/008* (2013.01)

(58) Field of Classification Search
CPC G01T 1/28; G01T 1/29; G01T 1/2935; G01T 1/185; H01J 49/025
See application file for complete search history.

(56) References Cited

U.S. PATENT DOCUMENTS

| | | |
|---|---|---|
| 8,519,350 B2 | 8/2013 | McGregor et al. |
| 8,653,470 B2 | 2/2014 | Dubeau |
| (Continued) | | |

FOREIGN PATENT DOCUMENTS

| | | |
|---|---|---|
| EP | 2293114 A2 | 3/2011 |
| JP | S61269089 A1 | 11/1986 |
| WO | 2011025853 A1 | 3/2011 |

*Primary Examiner* — David Porta
*Assistant Examiner* — Mamadou Faye
(74) *Attorney, Agent, or Firm* — Laurence Greenberg; Werner Stemer; Ralph Locher

(57) ABSTRACT

An energy-sensitive imaging detector for fast-neutrons includes energy-selective radiator foil stacks converting neutrons into recoil protons. The foils are separated by gas-filled gaps and formed of two interconnected layers: a hydrogen-rich layer such as a polyethylene layer for neutron-to-proton conversion, and a metal foil layer, such as an aluminum layer, defining a proton energy cut-off and limiting a proton emission angle. Energetic recoil protons emerging from the radiator foil release electrons in surrounding gas in the gaps. An electric field efficiently drifts the electrons through the gaps. An electron detector with position sensitive readout, based on Micro-Pattern Gaseous Detector technologies (such as THick Gaseous Electron Multipliers—THGEM) or other measures provides electron amplification in gas. The charge detector has a dedicated (Continued)

imaging data-acquisition system detecting the drifted electrons thereby sensing the position of the original impinging neutrons.

10 Claims, 3 Drawing Sheets

(56) References Cited

U.S. PATENT DOCUMENTS

| | | |
|---|---|---|
| 2005/0205798 A1* | 9/2005 | Downing et al. ......... 250/390.11 |
| 2006/0023828 A1* | 2/2006 | McGregor et al. ............ 376/158 |
| 2010/0258737 A1 | 10/2010 | McCormick et al. |
| 2011/0049380 A1* | 3/2011 | Dubeau .................... 250/390.07 |
| 2011/0309261 A1 | 12/2011 | Friedman et al. |
| 2012/0049054 A1* | 3/2012 | Zhou et al. ................... 250/265 |
| 2012/0217406 A1 | 8/2012 | McGregor et al. |
| 2012/0223242 A1* | 9/2012 | Brown et al. ................. 250/391 |
| 2013/0228696 A1 | 9/2013 | McGregor et al. |

\* cited by examiner

FIG. 5
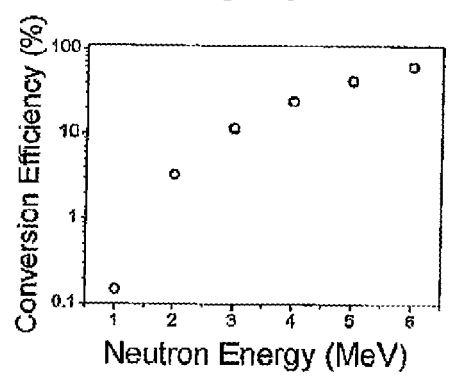
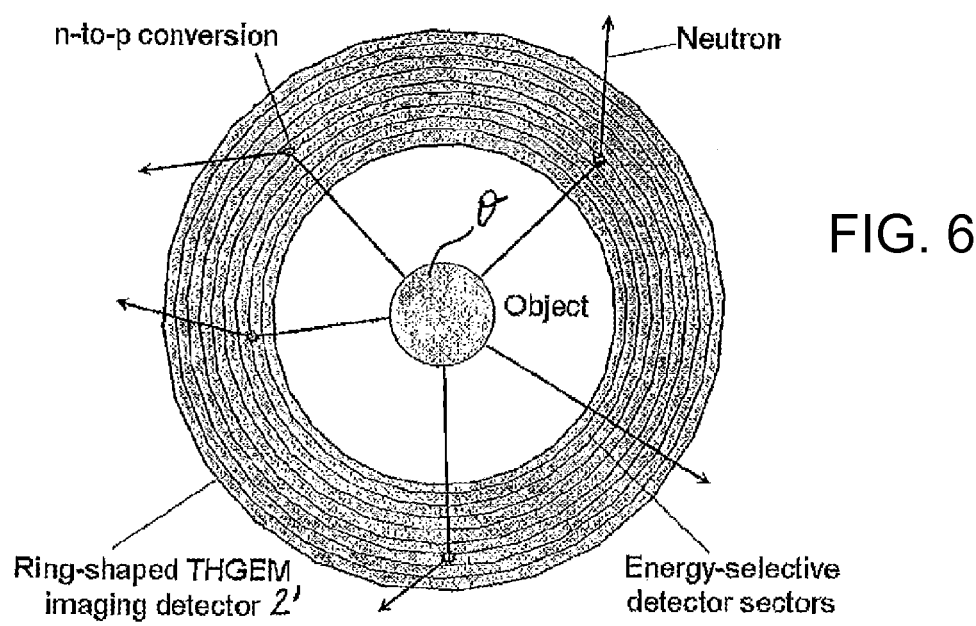
FIG. 6

ENERGY-SENSITIVE FAST NEUTRON IMAGING DETECTOR AND METHOD FOR ENERGY-SENSITIVE FAST NEUTRON DETECTION

BACKGROUND OF THE INVENTION

Field of the Invention

The present invention relates to an energy-sensitive fast neutron imaging detector and to a method for energy-sensitive fast neutron detection.

Neutron spectrometry can provide a wealth of information as a nondestructive measurement technique to support industrial, medical and security related activities. Unfortunately, it is difficult to accurately measure the energy of neutrons with both sufficient detection efficiency and sufficient energy-resolution to make meaningful and timely analyses in many cases. Even more complex is to combine spectroscopy and imaging capabilities. Energy determination by time of flight (TOF) measurements can be done for slow neutrons by using a nuclear reactor in combination with a chopper wheel or, for fast neutrons, using a pulsed neutron generator; however, this usually reduces the available neutron flux due to low duty cycles of the beam and the economical factors for these measurements are often prohibitive due to low turnaround in industrial field applications.

In particular, simultaneous spectroscopy and imaging with fast-neutrons poses a challenge: many applications require large-area detectors (up to m$^2$); the system should be mobile or at least relocatable, has to be robust, simple to operate and possibly produced at low cost. This has to be achieved within the limitations posed by the comparably low probability of neutron interaction with the detector material (cross-sections), and the stringent requirement of reasonable detection efficiency which dictates the thickness of an active radiator (neutron-to-proton converter) and thus the size of the detector.

Clearly, the demands placed upon fast neutron detection technology by the various basic researches and industrial applications are likely to increase with the complexity and the high neutron flux required in future systems. Large-area, open-structured, hydrogenous radiators based for fast neutron to recoil proton conversion have already been proposed (see for example the US Patent Application US 2011/00442577) in conjunction with a position-sensitive, GEM read-out for the induced charge.

Such detectors are also claimed to be relatively low cost ones and they can potentially fulfill many of the increasing demands. However, they possess no energy selective and spectroscopic capabilities excluding them for applications that the present invention is envisaging. Their radiator concept is also clearly different from the converter proposed hereinafter, namely their radiator with the gas-filled gaps faces axially the incoming beam while the converter proposed hereinafter is exposed to the beam from the side.

Presently, two different solutions exist and are used for combined imaging and spectroscopy or for energy sensitive imaging with fast neutrons. One of them features the aforementioned TOF technique for the energy selectivity and uses a hydrogenous fiber scintillator or converter in combination with single- or multiple-gated, intensified CCD camera system or pulse counting electronic or electro-optical amplification device for detection, timing and imaging of fast neutron events. The other one involves a high-resolution capillary scintillation fiber bundle. Based on the intensity and the (projected) length of the recoil proton tracks recorded in the capillary system, the energy of the incident neutron can be determined within certain accuracy. This last methodology, as well as the invention presented here, avoids the use of TOF technique; however its applicability is limited to rather small areas and comparably low neutron fluxes, which makes it unsuitable for high frame rate tomography. It is therefore irrelevant for the present invention.

BRIEF SUMMARY OF THE INVENTION

It is therefore the objective of the present invention to provide an energy-sensitive fast neutron imaging detector and a method for fast neutron detection and spectroscopy that have a comparably simple set-up at comparably low cost being enabled to resolve the energy of the neutrons fluxes.

This objective is achieved according to the present invention with respect to the detector by an neutron spectroscopy and imaging detector, comprising:
  a) a plurality of energy-selective stacks of radiator foils being penetrable by incident neutrons, said energy-selective stacks being disposed consecutively as seen in the flight direction of the incident neutrons, wherein
  b) the thickness of the radiator foils increases stepwise or continuously as seen in the flight direction of the incident neutrons and wherein consecutive radiator foils are separated by gas-filled gaps; and
  c) a position sensitive charge detector structures being associated with the radiator foils and/or the gas-filled gaps.

With respect to the method this objective is achieved according to the present invention by a method for energy-sensitive neutron detection, comprising the steps of:
  a) providing a plurality of energy-selective stacks of radiator foils being penetrable by incident neutrons, said energy-selective stacks being disposed consecutively as seen in the flight direction of the incident neutrons,
  b) providing a plurality of position-sensitive charge detector structures being associated with the radiator foils, wherein the thickness of the radiator foils increases stepwise or continuously as seen in the flight direction of the incident neutrons and wherein consecutive radiator foils are separated by gas-filled gaps;
  c) penetrating the plurality of energy-selective stacks with neutrons thereby generating recoil protons, said recoil protons generating by ionization electrons in the gas-filled gaps, said electrons being detected in the position sensitive charge detector structures; and
  e) determining the energy of the incident neutrons according to a spatial distribution of the detected electrons in the charge detector structures.

Therefore, incident fast neutrons write its traces into the detector depth by generating the recoil protons that themselves generate by ionization free electrons. By increasing the thickness of the radiator foils the final depth of the proton induced generation of the electrons by ionization of a gas filled into the gaps gives a clear relation to the energy of the incident neutrons. The determination of the spectral particle fluence is derived by unfolding the combined responses of the many energy selective stacks, those converter foils have different thickness. This set-up is both rather simple and realizable at rather low cost. Potential applications of this type of detector, being able to combine neutron spectroscopy and imaging capability, are rather broad, spanning from basic research to industrial applications, including monitoring, and characterization of special nuclear materials (i.e. nuclear safeguard), detection of neutron streaming and material activation in power plants for an assessment of the quantities of decommissioning waste, and other neutron-based techniques for non-destructive testing and elemental characterization of bulk materials (i.e. for material research or homeland security applications).

The generation of recoil protons can be supported in an efficient way when the radiator foil comprises a hydrogen rich radiator layer, such as a polyethylene layer or other plastic layer.

In order to improve the accuracy of the energy determination for the incident neutrons, the radiator foil may comprise an energy-selective coating layer fastened to the back side, as seen in the flight direction of the incident neutrons, of the hydrogen rich radiator layer. This energy selective coating layer has the property to slow-down or absorb recoil protons, thereby allowing only those recoil protons to penetrate the successive gas-filled gap (and thereby generating electrons by gas ionization) that have energies above a certain threshold value and are in a certain forward scattering angle range. Preferably, the energy-selective coating layer is a metal foil, e.g. an aluminum foil.

In order to optimize the overall efficiency of neutron-to-proton conversion, a preferred embodiment of the present invention provides for a stack-wise adjustment of the thickness of the hydrogen-rich radiator layer to the range, in the given hydrogen-rich material layer, of the recoil proton with a maximal energy corresponding to the incident neutron energy range envisaged to be resolved with the given stack of radiator foils. Furthermore, in order to discriminate the recoil protons in terms of their energy values, a preferred embodiment of the present invention provides for a similar stack-wise adjustment of the thickness of the energy selective coating layer on the radiator foils (as seen in the flight direction of the neutrons) to the range of the protons, in the given energy selective coating material, with the maximal energy corresponding to the incident neutron energy range envisaged to be resolved with the given stack of radiator foils. With other words, in an arrangement with a gradually increasing thickness of radiator foil stacks as seen in the flight direction of the incident neutrons, the higher the incident neutron and thus the recoil proton energies and the smaller the forward scattering angles are, the further are the stacks in the detector as seen in the flight direction of the incident neutrons, that will also give a response as the recoil protons overcome the increased thickness of the energy selective coating layer.

In order to increase the detection efficiency of the detector, a further preferred embodiment of the present invention provides for consecutive radiator foils being separated by a gas filled gap; said plurality of gas filled gaps being aligned with the position sensitive charge detector structures.

For the sake of detection efficiency, each energy selective stack may comprise a plurality of radiator foils. Preferably, the thicknesses of the radiator foils within the same energy threshold are constant.

In order to provide for a high electron multiplication, the position sensitive charge detector structures are preferably based on the Thick Gaseous Electron Multiplier principle thereby using Ne gas or a Ne-based gas mixture in the gas filled gaps. In particular, Ne gas and Ne-based gas mixtures resp. provide a high electron multiplication at very low operational voltage as compared to other standard gas mixtures, such as Ar-based mixtures.

In a further preferred embodiment of the present invention, the radiator foils are oriented preferably substantially perpendicular to the direction of the incident neutrons.

BRIEF DESCRIPTION OF THE SEVERAL VIEWS OF THE DRAWING

Preferred embodiments of the present invention are hereinafter described with more detail referring to the following drawings:

FIG. 5 schematically shows the conversion efficiency of a multi-layer radiator foil structure of polyethylene/Al foils having a thickness in the range from 0.55 mm to 3.4 mm.

FIG. 6 schematically depicts a two-dimensional ring shaped fast neutron detector readout, comprised of many energy selective sectors, enabling high spatial resolution detection for tomographic application (i.e. nuclear safeguards).

DESCRIPTION OF THE INVENTION

Figure 1:
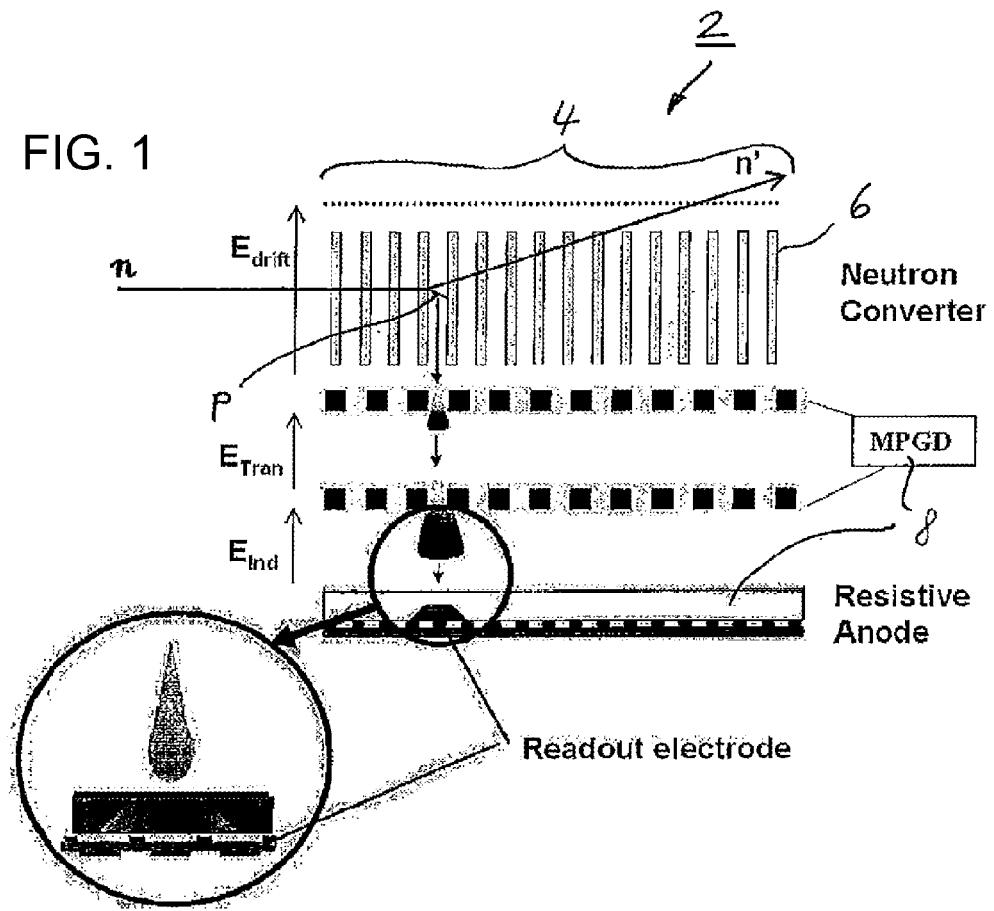
FIG. 1 schematically shows the imaging detector principle for the detection of fast neutrons.

FIG. 1 schematically shows the principle of an energy sensitive fast neutron detector 2—hereinafter referred to as detector 2—for the detection of fast neutrons n. The detector 2 comprises a plurality of energy-selective stacks 4 of radiator foils 6 which are coupled to position selective charge readout structures 8. In the present representation of FIG. 1 only one stack 4 is shown. The position selective charge readout structures 8 are typically Micro-Pattern Gaseous Detectors (MPGD), like standard Gaseous Electron Multiplier (GEM), or Thick Gaseous Electron Multiplier (THGEM), or Micro-Mesh Gaseous detector (MICROMEGAS), or other known charge detector structures.

Figure 2:
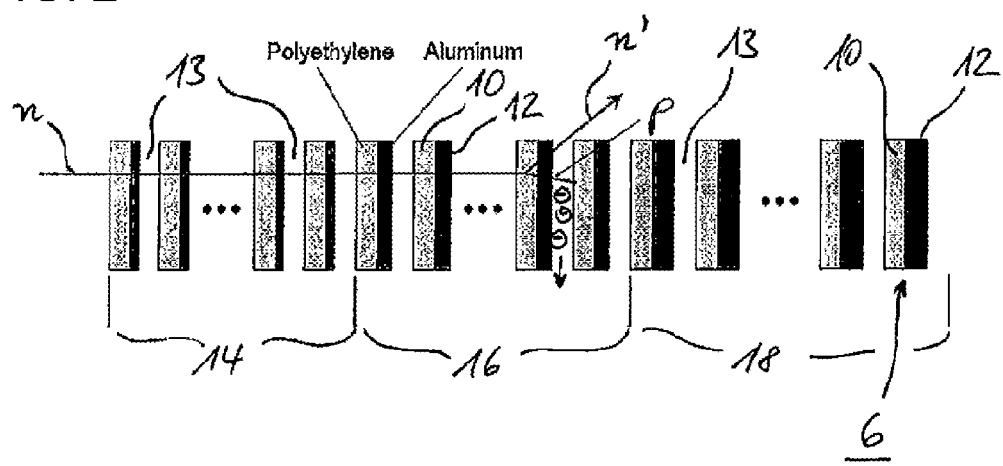
FIG. 2 schematically shows the architecture of the imaging detector with respect to the spectroscopic concept using various stacks of radiator foils having an increase in thickness of the hydrogen-rich radiator as well of the energy selective coating layer.

Each stack 4 comprises several radiator foils 6 that each comprises two layers fastened together (see FIG. 2):
 a) a hydrogen rich radiator layer 10 (for neutron-to-proton conversion) and
 b) an energy selective coating layer 12 (for defining a cut off proton energy and emission angle restriction).

Figure 3:
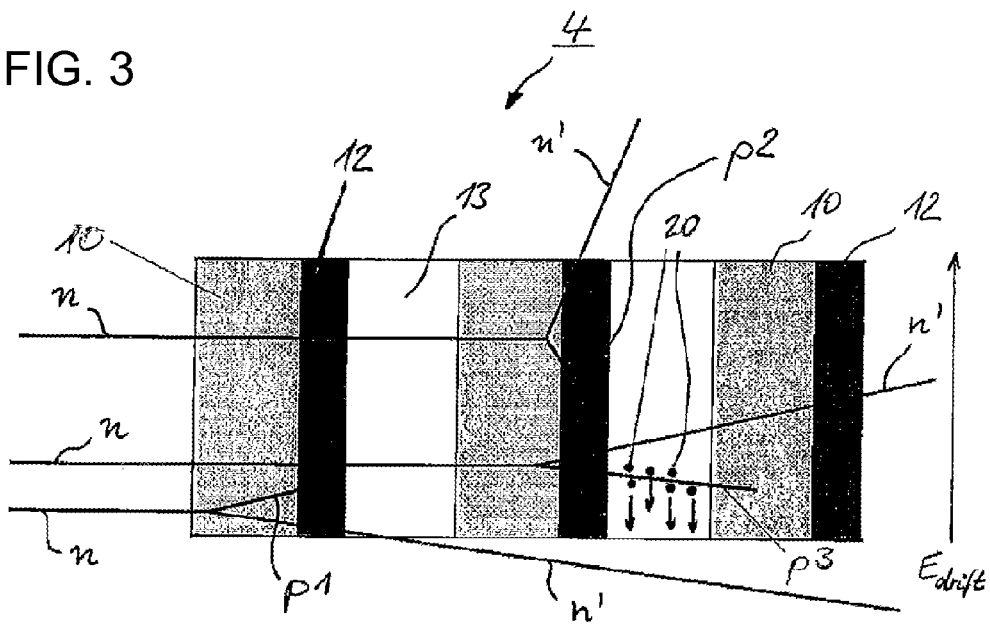
FIG. 3 schematically depicts the operational principle of the energy-sensitive, directional neutron to proton radiator foils and its gas-filled gap separation.

The consecutive foils 6 are separated by a gas-filled gap 13. Collision processes (mainly elastic n-p scattering, n' are the scattered neutrons) may occur between impinging neutrons n and hydrogen atoms inside the radiator layer 10, in one of the many stacks 14 to 18 along the neutron direction. Recoil protons p enter in the energy-selective coating layer 12 and are slowed down or absorbed. In FIG. 3, the situation for three incident neutron n is shown which generate three recoil protons p1, p2 and p3. According to the thickness of the energy selective coating layer 12 and the charged particle's recoil energy, only those protons (in FIG. 3 only the recoil proton p3) above certain energy values and within certain (forward) angles can escape the radiator foils 6 and ionize the gas in the gas-filled gap 13 thereby generating free electrons 20 in the gas-filled gap 13 between two consecutive radiator foils 6.

Figure 4:
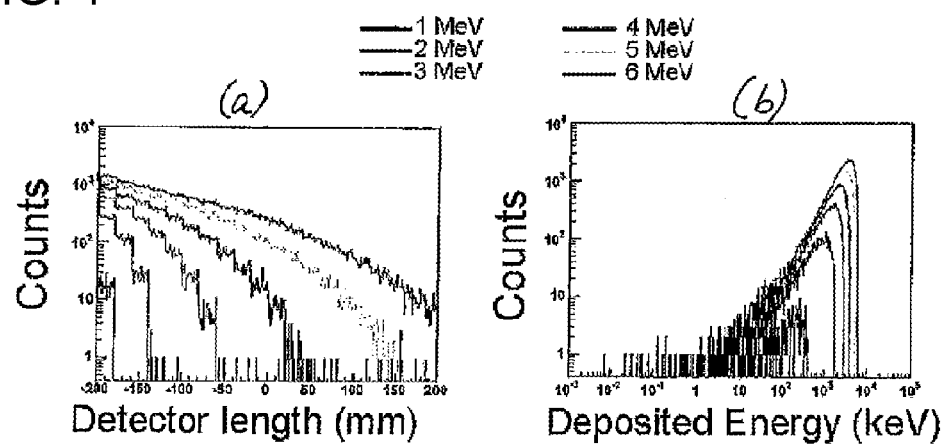
FIG. 4 schematically illustrates the response of the imaging detector to different neutron energies computed by simulating the radiator foil structure.

Upon application of a suitable electric field $E_{drift}$ (around 1 kV/cm), the ionization electrons 20 are drifted as shown in FIG. 3 in the gas-filled gaps 13 parallel to the surface of the radiator foils towards the two-dimensional arc- or ring-shaped MPGD-based readout 8. The MPGD causes gas avalanche multiplication by adequate electric field $E_{Tran}$ and $E_{Ind}$ and enables detection and localization. By assembling several stacks 4, 14 to 18 of foils 6 with increasing foil thicknesses—in the example of FIG. 2 the energy selective coating layers 12 have been increased in thickness—neutrons of different energies generate up to different locations (depth) inside the detector 2, a detectable response. E.g. low energy neutrons create recoil protons that can escape from the radiator foils 6 and ionize the gas-filled gaps 13 predominantly in the first section of thin radiator layers 10. So the energy response of these is peaked at comparably low neutron energy. On the other hand, towards the end of the stacks thicker radiator layers 10 and/or thicker coating layers 12 allow only high energy neutrons and their corresponding recoil protons p3 to escape into the gas to be detected. In this configuration, each stack 4, 14 to 18 has a different response function to the various impinging neutron energies; the spectroscopic information of the impinging neutron beam is then obtained by unfolding analysis. The size and the thickness of the radiator foils 6, as well as the dimension of the gas-filled gaps 13, can be varied to attain a particular detection performance and sensitivity to a particular neutron detection requirement and to a particular energy range. As an example, composite radiator foils 6 (Polyethylene/Aluminum) of total thickness increasing from 0.55 mm to 3.4 mm arranged in 20 stacks of 20 foils of the same thickness in each stack are considered. The total detector thickness is then about 40 cm. FIG. 4 (a) shows the corresponding detector response to neutrons in the range (1 to 6 MeV): as higher energy neutrons result in higher maximal recoil proton energy, they also produce a signal in increasingly further lying, thicker converter stacks. In this way, the spectroscopic information is spatially encoded in the distribution of the different responses along the detector (converter) length. FIG. 4 (b) shows the calculation of the energy deposited in the gas-filled gaps 13 by recoil protons p, p3. Finally, FIG. 5 shows the conversion efficiency of the simulated multi-layer structure above for the various neutron energies.

An alternative for the evaluation of the energy of the incoming neutron n consists in tracking of the recoil proton p. On its track towards its stopping point, the proton p can cross more than one radiator foils 6 and deposit ionization in several gas-filled gaps 13; the MPGD is able to visualize the trace. This requires thin foils 6 without aluminum coating and is particularly interesting for higher neutron energies. Given the flight direction of the neutron is defined (e.g. by a localized point source), from the length of the trace and the scattering angle, the energy of the neutron n can be estimated.

Due to the position sensitive readout (PSRO) of the MPGD the spatial distribution of the neutron beam intensity can be resolved in the dimension perpendicular to the electron drift direction and the flight path of the neutrons n. Thus, the detector 2 is capable of combined neutron beam profile monitoring and spectroscopy. The one-dimensional projection image of an investigated object O corresponds to the one-dimensional distribution of neutron attenuation inside the object O, integrated over the projection chords. The cross-sectional tomographic image of the object O can then be reconstructed based on the projection images, recorded at different angles.

Furthermore, the PSRO enables the measurement of the penetration depth of the neutrons 2 into the stacked foils 6 of the detector 2 until their place of interaction inside the detector 2. This is of particular importance for the case of non-isocentric irradiation geometries where the comparably large penetration depth of the neutrons n into the stacks 4, 14 to 18 of the detector 2 otherwise would lead to parallax uncertainties and seriously diminish the imaging resolution which is illustrated in FIG. 6.

It should be emphasized that the present invention can be materialized by using any MPGD technology with a PSRO or similar, the particular example of imaging detector here described uses THGEM as charge readout 8. THGEM is a quiet novel hole-type gaseous electron multiplier, fabricated using standard PCB techniques. The latter consists of perforated sub-millimeter holes in a double metal-clad FR4 plate and by a chemical etching of the rim around each hole; the latter is essential for reducing discharges which could be triggered by mechanical defects. Each hole functions as an independent proportional counter: upon application of a voltage difference across the THGEM, a strong dipole electric field is established within the holes. This strong field (few tens kV/cm) is responsible for an efficient focusing of ionization electrons into the holes, and their multiplication by gas avalanche processes. It is also possible to cascade several elements and to obtain higher detector gain at lower operating voltage per electrode.

Although THGEMs can operate in a large variety of gases, providing a high electron multiplication factor (up to $-10^4-10^5$ in a single element and $10^6-10^7$ with two THGEMs in cascade), the operation of Ne and Ne-based mixtures is of particular interest for the application here described: Ne provides high electrons multiplication at very low operational voltages compared to other standard gas mixtures (for example Ar-based mixture); low operational voltage has the advantage of providing more stable operational conditions and lower probability of damaging the electrode by electric discharges. Most importantly, Ne-based mixtures provide a large dynamic range; indeed, as a consequence of the high electron diffusion coefficient which is characteristic of these gas mixtures, the electron-avalanche is extended over a large volume and thus it is possible to build up a considerable amount of charge before reaching the space charge density limit. Large dynamic range is particularly crucial for applications with a highly-ionizing radiation background and for applications with a wide spectrum of deposited energy, which is always the case in fast-neutron interaction with matter.

Therefore, the present invention provides for a energy-sensitive imaging detector for fast-neutrons including:
a) a series of energy-selective stacks (4 to 14 to 18) of radiator foils (6) which converts neutrons (n) into recoil protons (p, p1 to p3); said foils (6) are separated by gas-filled gaps (13) and are made of two layers fastened together: a hydrogen-rich layer, such as a polyethylene layer (10) for neutron-to-proton conversion, and a metal foil layer, such as an aluminum layer, defining a proton energy cut-off and limiting angle of proton emission;
b) surrounding gas in the gas-filled gaps (13) in which energetic recoil protons emerging from the radiator foil release electrons;
c) an electric field ($E_{drift}$) able to efficiently drift the electrons (20) through the gas-filled gaps (13); and d) an electron detector with a position sensitive readout (PSRO), based on Micro-Pattern Gaseous Detector (MPGD) technologies (like e.g. the THick Gaseous Electron Multipliers—THGEM) or other means of electron amplification in gas; the charge detector is equipped with a dedicated imaging data-acquisition system, which detect the drifted electrons thereby sensing the position of the original impinging neutrons.

The invention claimed is:

1. An energy-sensitive neutron imaging detector, comprising:
   a) a plurality of energy-selective stacks of radiator foils being penetrable by incident neutrons, said energy-selective stacks being disposed consecutively in a flight direction of the incident neutrons;
   b) said radiator foils having a thickness increasing stepwise or continuously in said flight direction of the incident neutrons and including consecutive radiator foils being separated by gas-filled gaps, said radiator foils each including a hydrogen rich radiator layer and an energy-selective coating layer fastened to said hydrogen rich radiator layer, and said increasing thickness of said radiator foils being achieved by an increasing thickness of said energy selective coating layer; and
   c) a plurality of position sensitive charge detector structures being associated with at least one of said radiator foils or said gas-filled gaps.

2. The neutron imaging detector according to claim 1, wherein said energy-selective coating layer is a metallic foil.

3. The neutron imaging detector according to claim 2, wherein said metallic foil is an aluminum foil.

4. The neutron imaging detector according to claim 1, wherein said gas-filled gaps separating said consecutive radiator foils (6) are aligned with said position sensitive charge detector structures.

5. The neutron imaging detector according to claim 1, wherein each of said energy selective stacks includes a plurality of said radiator foils.

6. The neutron imaging detector according to claim 1, wherein said thickness of said radiator foils within the same energy selective stack is constant.

7. The neutron imaging detector according to claim 1, wherein said position sensitive charge detector structures are based on the Thick Gaseous Electron Multiplier principle thereby using Ne gas or a Ne-based gas mixture in said gas-filled gaps.

8. A method for energy-sensitive neutron detection, the method comprising the following steps:
   a) providing a plurality of energy-selective stacks of radiator foils being penetrable by incident neutrons, the energy-selective stacks being disposed consecutively in a flight direction of the incident neutrons, the radiator foils having a thickness increasing stepwise or continuously in the flight direction of the incident neutrons and including consecutive radiator foils being separated by gas-filled gaps;
   b) providing each of the radiator foils with an energy selective coating layer having proton blocking properties and a hydrogen rich radiation layer having a back side in a direction of an incoming neutron beam, fastening the energy selective coating layer to the back side of the hydrogen rich radiation layer, and achieving the increase in the thickness of the radiator foils by increasing a thickness of the energy selective coatings;
   c) providing a plurality of charge detector structures being associated with the radiator foils;
   d) penetrating the plurality of energy-selective stacks with neutrons thereby generating protons, the protons generating ionization electrons in the gas-filled gaps;
   e) detecting the electrons in the charge detector structures; and
   f) determining the energy of the incident neutrons according to a spatial distribution of the detected electrons in the charge detector structures.

9. The method according to claim 8, which further comprises adjusting the thickness of the hydrogen-rich radiator layers to the thickness of the energy selective coatings in each stack to achieve maximal detection efficiency.

10. The method according to claim 8, which further comprises orienting the radiator foils substantially perpendicular to a direction of the incident neutrons.

* * * * *